US008195087B2

(12) United States Patent
Nelson et al.

(10) Patent No.: US 8,195,087 B2
(45) Date of Patent: *Jun. 5, 2012

(54) CONTROLLING OF WIRELESS CONNECTION OF A PORTABLE DEVICE INCLUDING AN ILLUMINATING COMPONENT OR SWITCH

(75) Inventors: Jonathan Nelson, Seattle, WA (US); David Schultz, Seattle, WA (US)

(73) Assignee: Varia Holdings LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/158,269

(22) Filed: Jun. 10, 2011

(65) Prior Publication Data

US 2011/0237181 A1    Sep. 29, 2011

Related U.S. Application Data

(63) Continuation of application No. 11/971,062, filed on Jan. 8, 2008, now Pat. No. 7,983,612.

(60) Provisional application No. 60/884,004, filed on Jan. 8, 2007.

(51) Int. Cl.
*H04B 1/40* (2006.01)
*H04W 72/02* (2009.01)

(52) U.S. Cl. ............... 455/3.06; 455/435.2; 455/41.2; 455/517; 455/566

(58) Field of Classification Search .................. None
See application file for complete search history.

(56) References Cited

U.S. PATENT DOCUMENTS

| 6,725,064 | B1 * | 4/2004 | Wakamatsu et al. | 455/566 |
| 6,816,067 | B2 * | 11/2004 | Patton | 340/505 |
| 7,076,210 | B2 * | 7/2006 | Sasai et al. | 455/41.2 |
| 7,467,302 | B2 * | 12/2008 | Kao et al. | 713/183 |
| 7,983,612 | B2 * | 7/2011 | Nelson et al. | 455/566 |
| 2006/0278715 | A1 * | 12/2006 | Hamilton et al. | 235/472.01 |

* cited by examiner

*Primary Examiner* — Philip Sobutka
(74) *Attorney, Agent, or Firm* — Schwabe, Williamson & Wyatt, P.C.

(57) ABSTRACT

A portable media player that provides for wireless connectivity is disclosed. In some examples, the portable media player contains a button that causes the player to search for, connect with, and disconnect from wireless networks. In some examples, the button provides indicators of the connectivity of the player, such as different colors or modes of illumination. In some examples, the functionality of the button changes depending on the connectivity of the player or characteristics of the playback or navigation of media within the player. Other embodiments are also described and claimed.

19 Claims, 7 Drawing Sheets

CONTROLLING OF WIRELESS CONNECTION OF A PORTABLE DEVICE INCLUDING AN ILLUMINATING COMPONENT OR SWITCH

CROSS REFERENCE TO RELATED APPLICATIONS

This application is a continuation of U.S. patent application Ser. No. 11/971,062, filed Jan. 8, 2008, and entitled "CONTROLLING OF WIRELESS CONNECTION OF A PORTABLE DEVICE INCLUDING AN ILLUMINATION COMPONENT OR SWITCH," which claims the benefit of U.S. Provisional Patent Application No. 60/884,004, filed Jan. 8, 2007, and entitled CONTROL OF WIRELESS CONNECTION FOR A PORTABLE MEDIA PLAYER. Both applications are hereby incorporated by reference in their entirety.

BACKGROUND

Portable media players are increasing in popularity. A portable media player is a transportable device that plays one or more media file types, including text, audio, video, graphics, animation, images, interactive, and other media file types.

Many portable media players were originally developed to play music files, such as mp3 files. These players were dedicated to the playback of music, and offered little or no additional functionality. As players have increased in popularity, however, developers or manufacturers of players have sought to gain users by incorporating other functionalities into media players. For example, media players may provide wireless connectivity, such as connectivity with 802.11 ("Wi-Fi") networks. However, because media players are designed to play media and wireless connectivity is not established in most players, users may find it difficult to manage or properly utilize the wireless capabilities of a portable music player.

These and other problems exist with respect to portable media players.

DETAILED DESCRIPTION OF ILLUSTRATIVE EMBODIMENTS

A method and system for initiating wireless connections and providing connection status for a portable media player is described. The system includes an input control, such as a button placed externally on a portable media player, which acts as a connection initiator and/or as a status indicator for wireless communications. When a media player is not connected to a wireless network, a press of the button may cause the system to detect accessible networks in proximity to the player and to display one or more of the detected networks to a user. When the media player is already connected to a wireless network, a press of the button may cause the system to detect a current status of the network connection and display the detected status information to the user. In some cases, the button includes an indicator light that provides a visual indication of the network connection status between the player and a wireless network.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Figure 1:
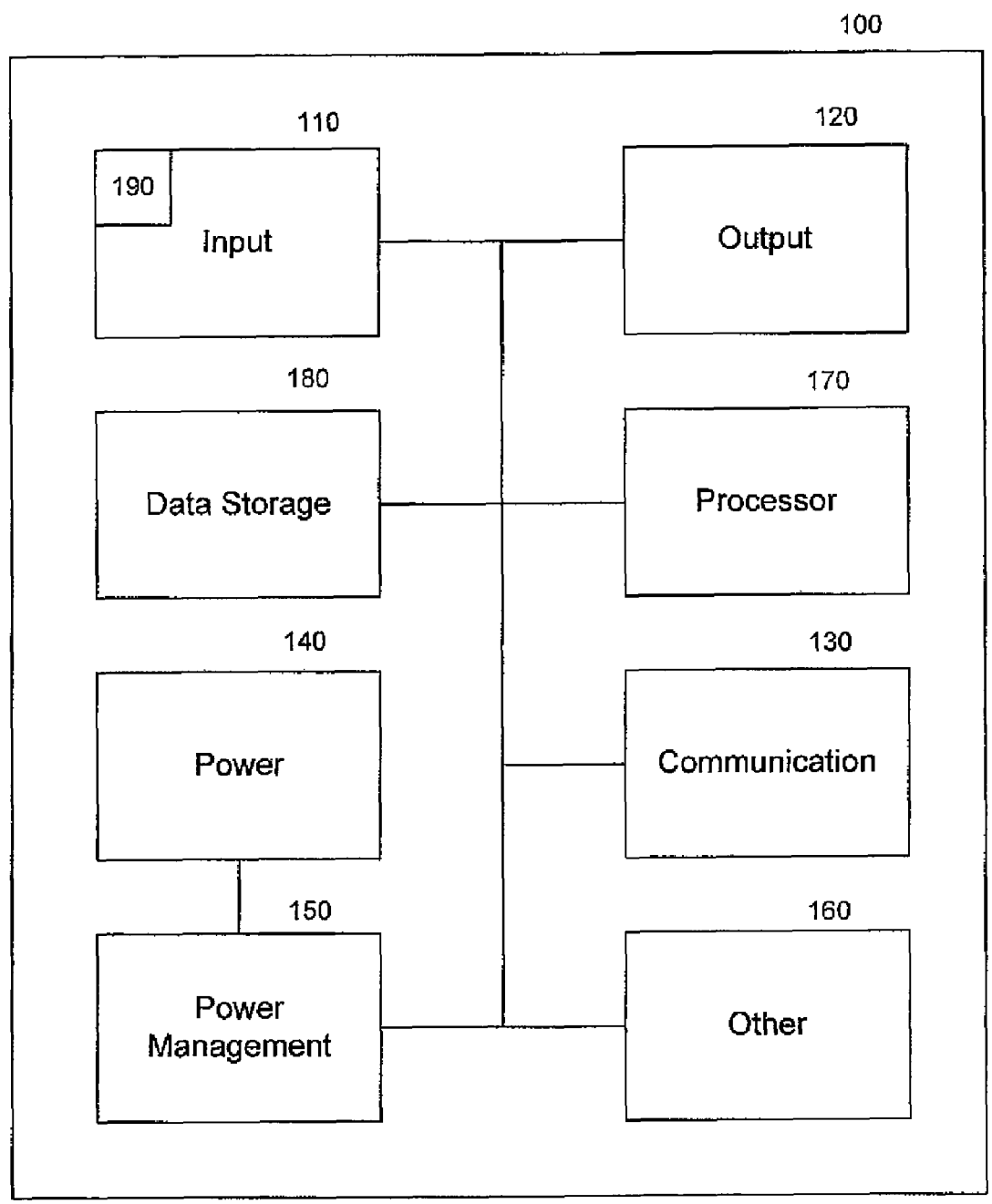
FIG. 1 is a block diagram illustrating representative components of a portable media player, in accordance with various embodiments.

FIG. 1 is a block diagram illustrating representative components of a portable media player 100, in accordance with various embodiments. Portable media player 100 may include an input component 110 and an output component 120 enclosed in an housing. In various embodiments, the housing may be palm-sized for portability. Input component 110 may be configured to receive user input from one or more input controls, such as buttons, scroll wheels, touchpads, and so on. For example, player 100 may receive an adjustment to playback volume via input component 110. Output component 120 may be configured to provide output to a user, and may include an audio playback module, a display module, a vibrate module, a light module, and so on. Portable media player 100 may also include a data storage component 180. Data storage component 180 may be a magnetic media drive, optical media drive, other non-volatile memory, flash memory, and so on, capable of storing audio media, video media, image media, and other media types for playback via output component 120. The portable media player may also include a processing component 170, a power component 140 that supplies power to the player and the components of the player, a power management component 150, and a communication component 130 that communicates with other devices and networks, such as via a wireless network. Examples of communication include wired communication, such as over a USB or firewire connection, wireless communication, such as via 802.11 based networks, and so on. Player 100 may also include other components 160, such as components enabling use of the player as a mobile phone, not specifically described herein.

Figure 2:
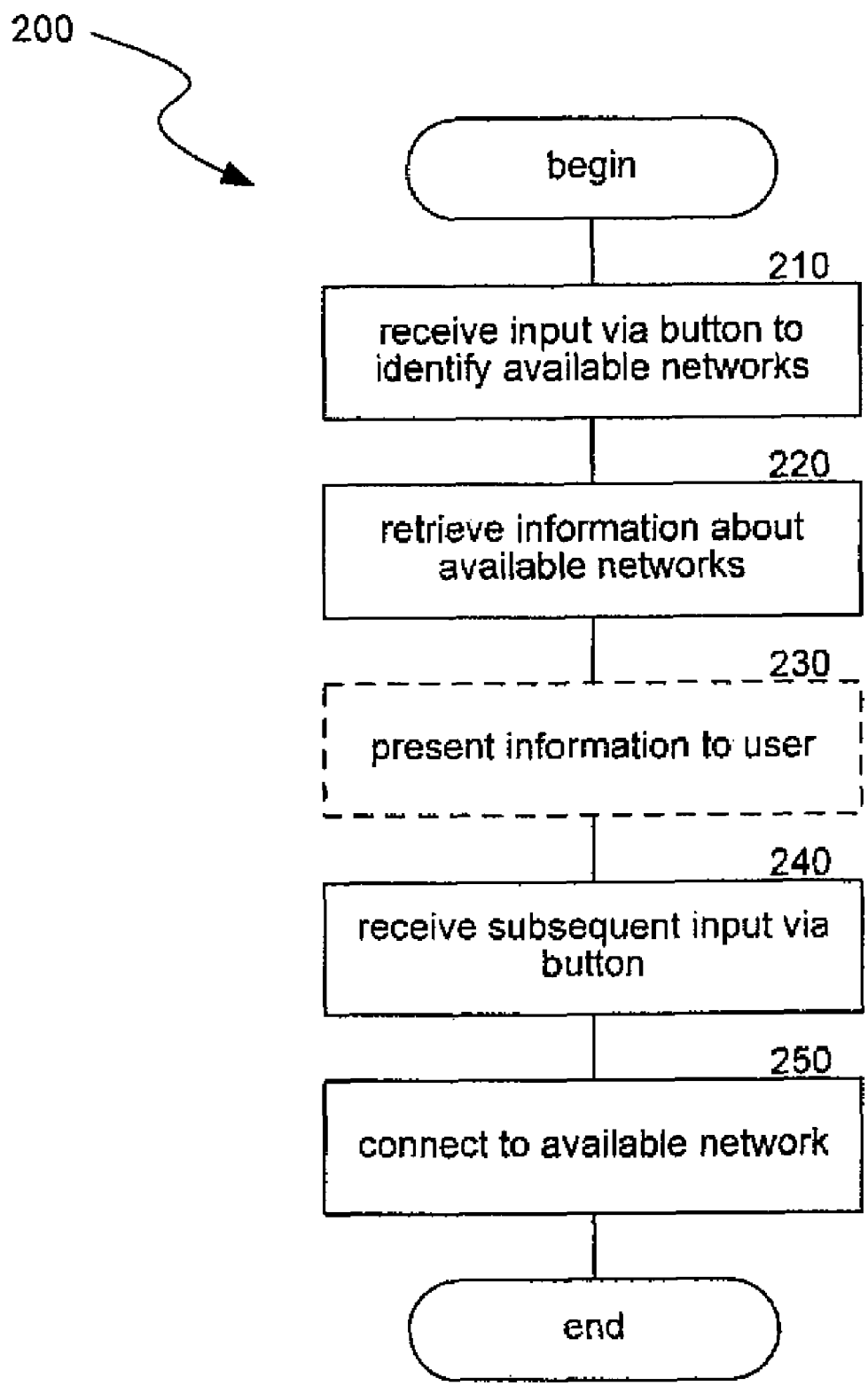
FIG. 2 is a flow diagram illustrating a routine for connecting to a wireless network, in accordance with various embodiments.

A network button 190 is provided on the portable media player 100 as part of a system to provide a wireless connection initiator and status indicator for the player. When the portable media player 100 is not connected to a wireless network and the system receives an indication that a user has pressed network button 190, the system detects and displays information about available networks in proximity to the player, and allows a user to connect with one of the displayed networks. FIG. 2 is a flow diagram of a routine 200 that allows users of the media player to connect with a wireless network using the network button 190, in accordance with various embodiments. In operation 210, the media player 100 detects that the network button 190 has been depressed when the player is not already connected to a wireless network, indicating a user's desire to search for available networks. When a user presses the button, the system operates to identify one or more available networks within range of the player. In operation 220, the system retrieves information about one or more available networks in proximity to the player.

Figure 3:
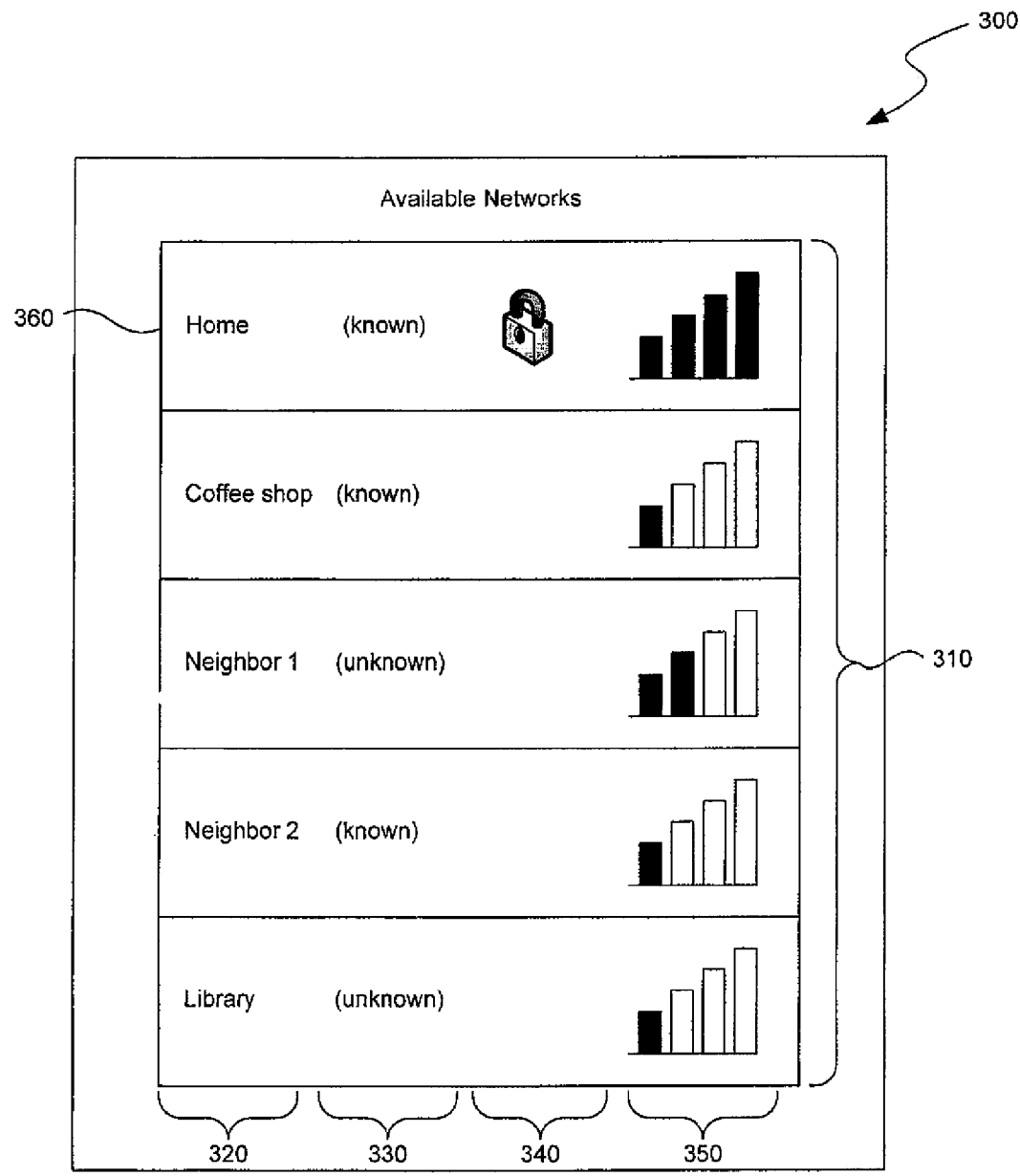
FIG. 3 is a representative screenshot depicting available wireless networks that may be accessed by a portable media player, in accordance with various embodiments.

In operation 230, the system displays information related to some or all of the detected networks to the user. In some cases, the system displays familiar networks ahead of unfamiliar networks. Familiar networks may be any networks previous utilized by the player, such as a user's home network, work network, school network, or a network at a location frequented by the user (e.g. the local coffee shop or library). Unfamiliar networks are those networks that the player has not previously accessed. In some cases, the system displays the detected networks in order of signal strength, or displays secured networks and unsecured networks in groups. The system may also display various types of information related to the detected networks, including the name of the network, the strength of the network, the type of network (i.e., 802.11(b), 802.11(g), and so on), the security of the network, the familiarity of the network, any user-assigned information (e.g., a name that the user has assigned to the network), and so on. FIG. 3 is a representative display 300 showing a list 310 of networks that might be displayed by the media player, in accordance with various embodiments. Each network in the list 310 includes a name or assigned name 320 for the network, an indication of previous use 330 of the network, an indicator related to the security 340 of the network, and a measure of the signal strength 350 of the network. For example, network 360 is a network accessible from the home of a user. The "home" network is known to the user, is a secure network, and has high signal strength.

A user may select one of the displayed networks with which to connect. The network may be selected by moving a cursor to the network and clicking on the network, by accepting a network recommendation from the player, or by otherwise identifying one of the networks in the list of displayed networks. Returning to FIG. 2, in operation 240 the system detects that the button 190 has been depressed by the user a second time, indicating the selection of a network from the list of displayed networks. In operation 250, the player connects to the selected network after receiving the user input. If the connection does not occur, the system may receive an alternate network selection from the user or may automatically attempt to connect to another network (e.g., based on signal strength, familiarity of network, etc.).

While the routine 200 contemplates that a user will press the network button 190 twice to connect to a desired network, it will be appreciated that the routine may be modified so that a single press of the network button will cause the player to connect to a network. For example, the system may automatically attempt to connect to the first listed network presented to the user. As another example, the player may not present the available networks to the user and may connect to a network based on a selection algorithm that takes into account signal strength, familiarity of the network, etc. In such an event, the user may not know which network the system has chosen for connection.

Figure 4:
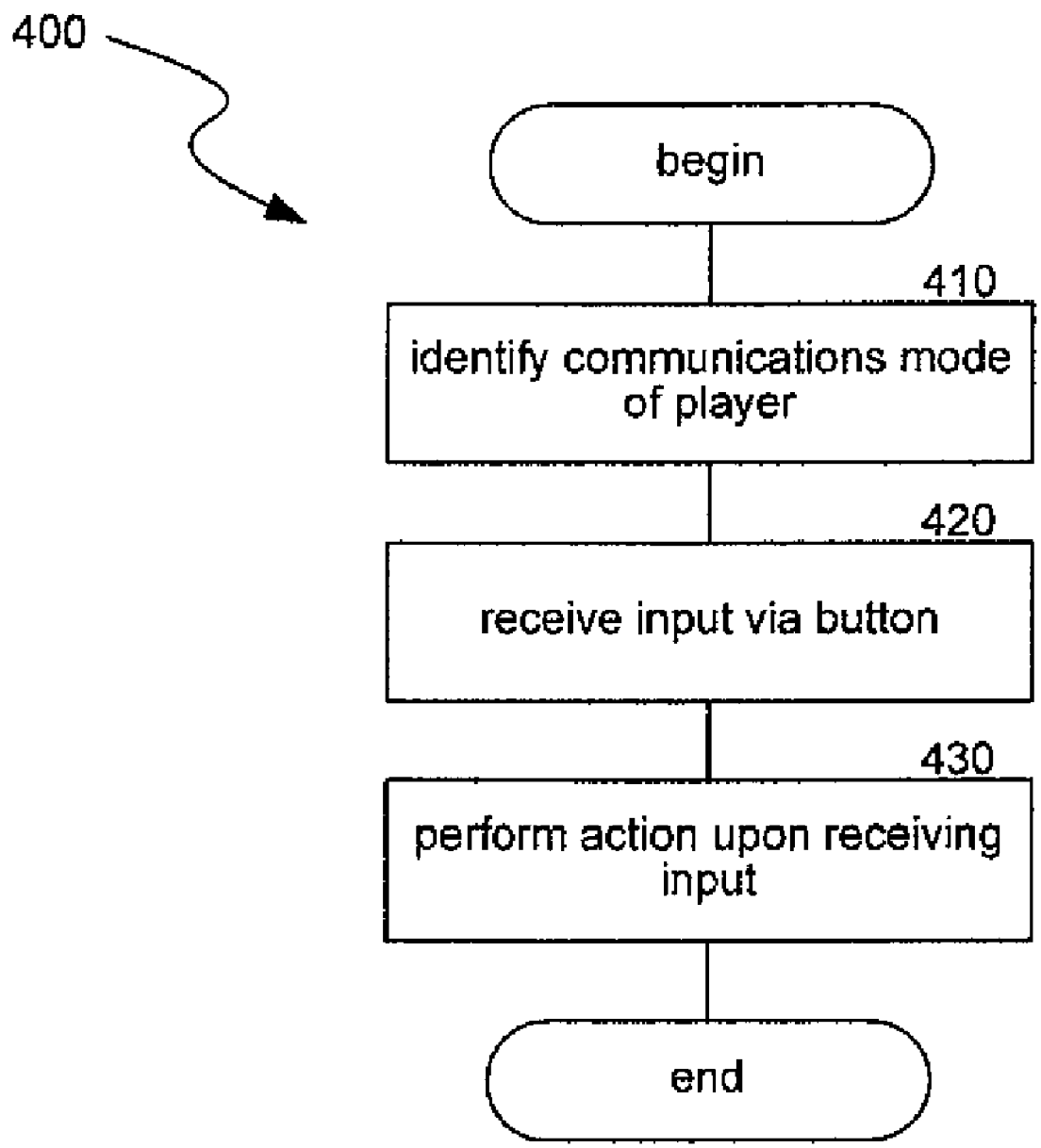
FIG. 4 is a flow diagram illustrating a routine for performing an action based on a communications mode of a player via a single button, in accordance with various embodiments.

When the portable media player 100 is already connected to a network and the system receives an indication that a user has pressed network button 190, the system may detect the current status of the network connection and display information associated with the network connection to the user. FIG. 4 is a flow diagram illustrating a routine 400 for detecting and displaying information pertaining to the network status of a player 100 using a single button 190, in accordance with various embodiments. In operation 410, the system identifies a communications status of the player. For example, the player may be connected to a network and idle, may be connected to a network and currently downloading media, may be searching for available networks, and so on. In operation 420, the system detects that the network button 190 has been pressed by a user of the player 100. When the system detects that the network button has been pressed, a variety of actions may be taken depending on the communications status of the player.

Figure 5:
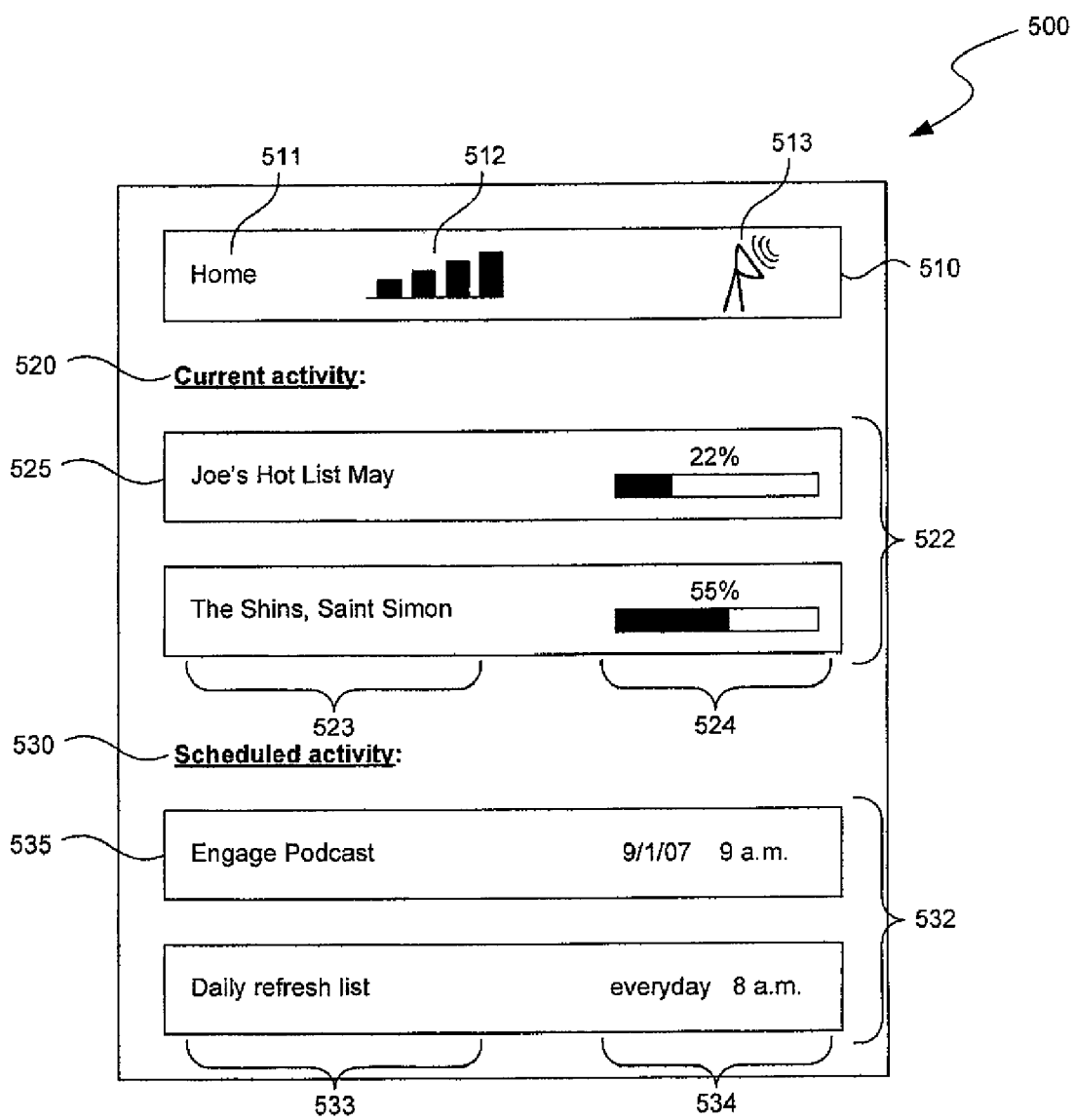
FIG. 5 is a representative screenshot depicting the status of downloads over a wireless network that may be accessed by a portable media player, in accordance with various embodiments.

In operation 430, the system may take one or more actions depending on the communication status of the player. For example, the system may display the name of the network, the strength of the network, the type of security on the network, the number of packets transmitted via the network connection, and so on. Additionally, the system may display information related to download activity on the network connection. For example, the system may display any download of media that was previously completed, is currently occurring, or is scheduled to occur during the wireless connection session. The system may also display any wireless activity during a certain period of time (such as any downloads from a previous week), or may display a history of downloaded media (such as the last 200 media downloads). FIG. 5 is a representative display 500 depicting the status of a network connection and the current and scheduled downloads that are expected to take place on the network connection, in accordance with various embodiments. Display 500 includes a network status region 510 that presents information related to the network. For example, region 510 presents the name 511 of the network, the current signal strength 512 of the network, and an icon 513 or other symbol that indicates the status of the connection (in this case, the icon indicates that the network is connected). Display 500 presents a current activity region 520 associated with the network 511 connection, such as a list 522 of currently downloading media and information related to the media. Items in the list 522 may include the name of the media 523 and the status of the download 524. For example, the first media item 525 in the list 522 is named "Joe's Hotlist May" and 22% of the file has been downloaded to the player. Display also presents a scheduled activity region 530 that presents information related to the upcoming use of the network, such as pending downloads or scheduled downloads. The scheduled activity is displayed in a list 532. Items in the lists 532 may include the name 533 of the media item scheduled for download and the scheduled date 534. For example, media item 535 of the list 532 is named "Engadget podcast" and is scheduled to be downloaded to the player on Sep. 1, 2007 at 9 A.M. (e.g., when the podcast is made available to the public). Although not depicted, the system may present information related to past activities that occurred over the network connection, such as media recently downloaded by the player.

The system may implement enhanced network functions if a number of network button 190 presses are detected in succession. For example, if a user depresses the network button 190 for a second time in close succession to the first, the system may remove the network connectivity display or may disconnect the network (e.g., if a user has moved a cursor to a network disconnection option). The system may implement additional functionality if two or more button pushes are detected, such as disconnecting a network when already connected, creating a connection to a first ordered or recommended network when not connected, providing a pop-up box of network options, providing a screen to access and download media, and so on. As another example, if media is currently being downloaded to the player, the player may pause the download upon detecting that the network button has been pressed twice. A subsequent button press may reinstate the paused download.

Figure 6:
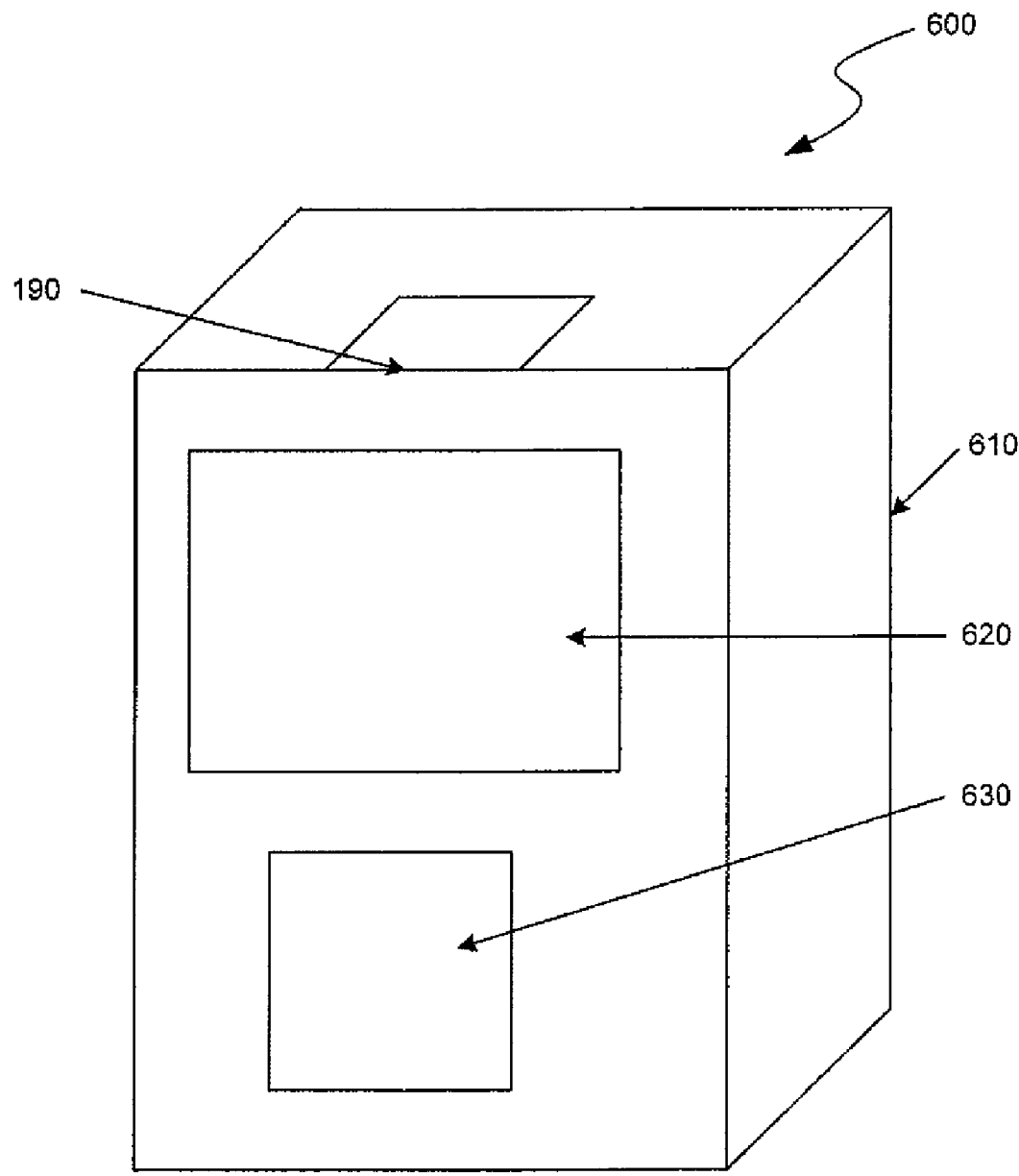
FIG. 6 is a block diagram illustrating a portable media player and wireless network button, in accordance with various embodiments.

The network button 190 is placed on the player to facilitate a user connecting to a network or to provide the status of a connection via a lighted indicator without distracting the user. FIG. 6 illustrates an example portable media player 600. Player 600 includes a housing 610, a display 620, and an input component 630, such as a touchpad, button, scroll wheel, and so on. The network button 190 is placed on the top of the media player housing 610 for a number of reasons. For example, the button is placed on top of the housing to be away from the display 620 or input component 630. Because the network button may be illuminated, placing the button on top allows the user to view the display of the player without being distracted by the button. The top placement is also an intuitive and easy to use location for users, as antennas and other connection components are often placed on top of other wireless devices. And, as will be described in additional detail herein, placing a backlit button on the top of the player allows the user to easily check a network connection status light without having to remove the player from a holster or other pocket that the user may be using to carry the player.

The network button 190 may provide a visual indication of an existing wireless connection or a possible wireless connection. The button 190 may contain a light emitting device (LED) or other light emitting component. The system may indicate a number of different network statuses based on the illuminated mode of the button 190, such as the illumination color, the intensity of illumination (e.g., dim, bright), and the speed and duration of blinking. For example:

A red-orange light may indicate that the player is not currently connected to a wireless network, but there are available but unfamiliar networks in proximity to the player;

A dim green light may indicate that the player is not currently connected to a wireless network, but there are available familiar networks in proximity to the player;

A bright green light may indicate that the player is currently connected to a wireless network; and A bright green and blinking light may indicate that the player is connected to a wireless network and currently receiving data (i.e., the player is downloading media).

Pressing the network button 190 during one of the above states may cause the system to display network information as described herein. For example, pressing the button when a bright green light is blinking causes the system to display information related to the media being downloaded, the status of the download, and so on.

The system may use other colors or other illumination modes when appropriate. For example, the system may use other colors or illumination modes to denote familiar versus unfamiliar networks, secure versus unsecure networks, the strength of a connected network, the charging of the player's battery, and so on. The system may alternate the display of colors, may display colors using one or more patterns of blinking or indication, may dim or brighten a displayed color, and so on.

The system may use the button to provide information related to other operations or states of the portable media player. For example, the button may provide information about the battery level of the player (such as the remaining power) and/or the storage capacity of the player (such as the remaining storage capacity).

In some cases, the presentation of illumination may be from illumination sources not contained by the button. For example, an LED or other illumination source may be located separate from the button and on the housing of the portable media player. In addition, the backlight or other display lighting may act to provide modes of illumination described herein.

A user of the media player may be guided by the discussed colors and illumination modes of the network button 190 to perform certain actions. For example, the user may see a red-orange button, and press the button to search for available networks. Once an available network is found, the button may change to dim green, indicating that there is an available network for the player, prompting the user to press the button again. The player, upon receiving the input, connects to the network and displays a bright green light.

Should the user wish to download media to the player, the user may navigate to a desired media item via the display 430 and input controls (such as touchpad 420). Upon highlighting or selected the desired media item, the network button 190 may provide a lighted indication to the user that the media is available for download. For example, the button may alternate between green and blue. The user, acknowledging the indication, may press the button, prompting the player to download the desired media item.

Figure 7:
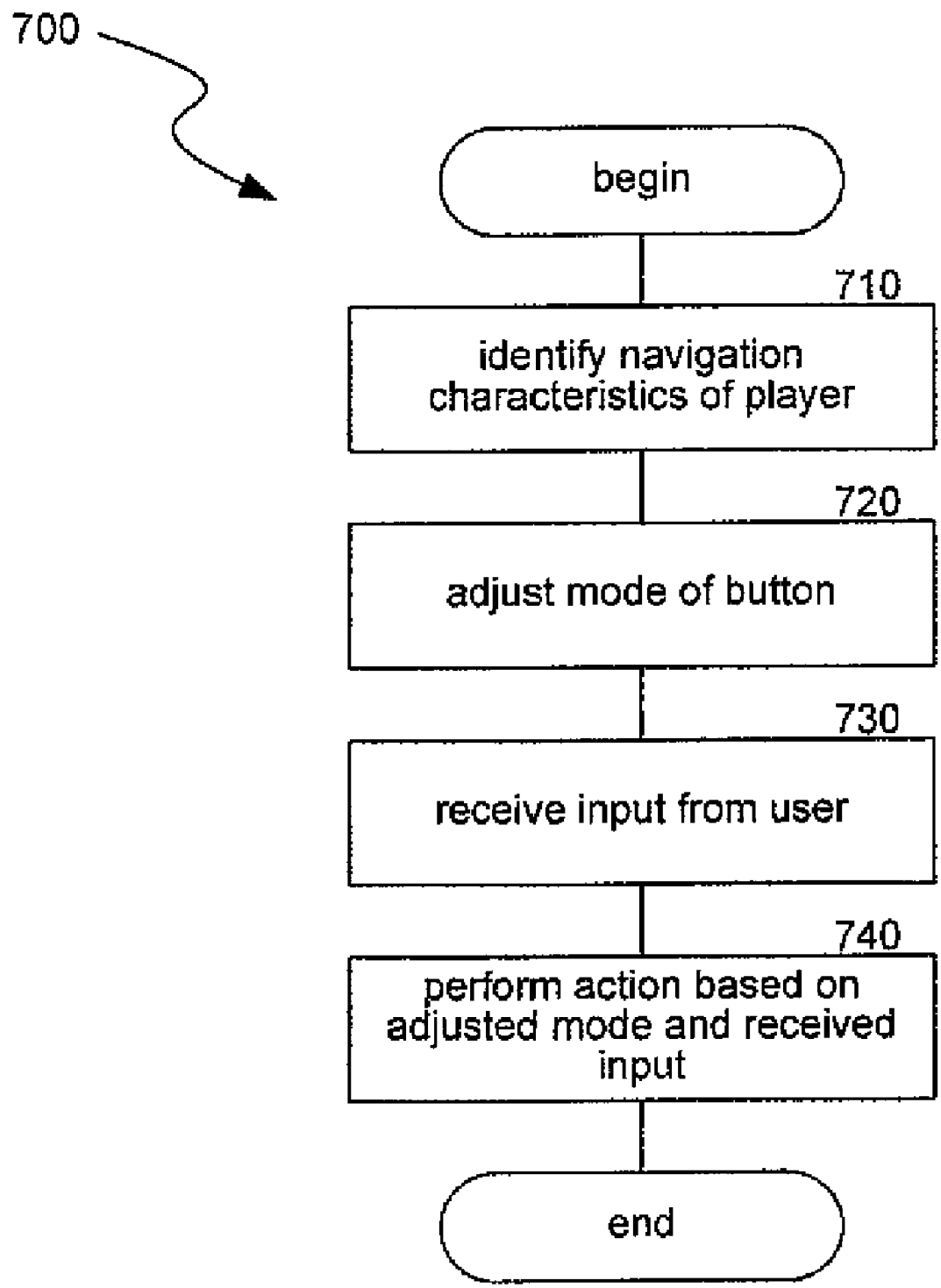
FIG. 7 is a flow diagram illustrating a routine for performing an action based on navigation characteristics of a player via a single button, in accordance with various embodiments.

The system may also adjust or modify the functionality of the button 190 based on the playback or navigation state of the player. FIG. 7 is a flow diagram of a routine 700 that allows a user to initiate different actions in a player using a single button based on the playback or navigation state of the player, in accordance with various embodiments. In operation 710, the system identifies the navigation or playback state of the player 100. For example, the system may identify that a user has navigated to a media item not currently downloaded to the player. In operation 720, the system adjusts the mode or functionality of the button. For example, instead of a normal mode where the button is configured to search for available networks, the system has identified that the user has selected a media item for download and enters an adjusted mode of operation where the functionality of the button is changed to download a selected media item. In operation 730, the system detects that the user has pressed the button 190. In operation 740, the system performs an action based on the adjusted mode of operation. In this example, the player downloads the selected media item.

The system may also adjust the illumination of the button based on the navigation or playback state of the player. After the player is connected to a network, the system may use the various colors to indicate actions to be performed upon request from the user. For example, if a user is listening to a list of songs, the button may slowly change from green to red as the song list proceeds to the end of the list. In this example, the system informs the user that there are no more songs in the list, and may prompt the user to download other similar songs. For example, once the button turns to red (or a reddish color), the system may identify similar songs (such as other songs by current artists within the song list), and a subsequent press of the button may prompt the player to download similar songs. Thus, the illumination of the button may change as the player moves from one state to another.

In general, the button and corresponding illumination mode of the button (or other illumination indicator) may present high level information about a state of operation of the portable media player and a display may present more detailed information about the state of operation. For example, the button may display a bright green color indicating the portable media player is connected to a wireless network. If the button is pressed by a user, the player may present details about the connected wireless network via a display of the player, such as the name of the network, the strength of the connection, the download activity over the network, and so on. As another example, the button may display a slow blinking red light when a battery level of the portable media player drops below a certain threshold level. If the button is pressed by a user, the player may present a more detailed view of the battery level via a display of the player, such as a percentage of remaining battery level, the amount of use time remaining, and so on.

Thus, the system may use the network button (and corresponding illumination mode) to provide a user with high level information about the state of operation of one or more components of the portable media player. In addition, the system may provide more detailed information about the operation of the player when the button is depressed by the user or the user otherwise indicates a desire to see additional information. The button may therefore serve to provide some information about player operation and functionality and facilitate retrieval of more detailed information about player operation and functionality.

The above detailed description of the technology is not intended to be exhaustive or to limit the technology to the precise form disclosed above. While specific embodiments of, and examples for, the technology are described above for illustrative purposes, various equivalent modifications are possible within the scope of the technology, as those skilled in the relevant art will recognize. For example, while processes or blocks are presented in a given order, alternative embodiments may perform routines having operations, or employ systems having blocks, in a different order, and some processes or blocks may be deleted, moved, added, subdivided, combined, and/or modified. Also, while processes or blocks are at times shown as being performed in series, these processes or blocks may instead be performed in parallel, or may be performed at different times. Each of these processes or blocks may be implemented in a variety of different ways.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for connecting a portable media player with a wireless communications network, the system comprising:
    an actuator located on the portable media player;
    a wireless connection component in communication with the actuator, the wireless connection component configured to search for available wireless networks, to detect one or more available wireless networks, and to display an indication of one or more of the one or more available wireless networks to a user when the wireless connection component detects the selection of the actuator by a user during a period when the portable media player is not connected to a wireless network; and
    an illumination component associated with the actuator, wherein the illumination component is configured to indicate a communications state of the wireless connection component via a mode of illumination.

2. The system of claim 1, wherein the wireless connection component is configured to connect to one of the available wireless networks when it detects a second selection of the actuator by the user.

3. The system of claim 1, wherein the wireless connection component is further configured to automatically connect to one of the available wireless networks.

4. The system of claim 1, wherein the wireless connection component is configured to display information about a connection with the wireless network, upon detecting the selection of the actuator by a user during a period when the portable media player is connected to a wireless network.

5. The system of claim 1, wherein the illumination component is configured to indicate the communications state of the wireless connection component by different colors of illumination, different blinking rates of illumination or different intensities of illumination.

6. The system of claim 1, wherein the illumination component is configured to indicate the communications state of the wireless connection component through different colors of illumination, including:
    presenting a first color when the wireless connection component is searching for available wireless networks,
    presenting a second color, different from the first color, when the wireless connection component is retrieving one or more of the available networks,
    presenting a third color, different from the first and second colors, when the wireless connection component is connecting to one of the one or more available wireless networks, and
    presenting a fourth color, different from the first, second and third colors, when the wireless connection component is connected to one of the one or more available wireless networks.

7. A communications controller for use in a portable media player, the communications controller comprising:
    an actuator contained in a housing of the portable media player, wherein the actuator receives input from a user indicative of a command associated with the communications state of the portable media player;
    a communications control component coupled to the actuator and configured to implement a command associated with the communications state of the portable media player when the input is received from the user; and
    an illumination component associated with the actuator and coupled to the communications control component, wherein the illumination component is configured to selectively provide one of a plurality of modes of illumination based on a communications state of the portable media player, and wherein the selectively provided mode of illumination pertains to the communications state of the portable media player.

8. The communications controller of claim 7, wherein the command is designed to change the communications state of the portable media player.

9. The communications controller of claim 7, wherein the command is designed to cause the status of communications with the portable media player to be displayed.

10. The communications controller of claim 7, wherein the modes of illumination comprise different colors of illumination, different intensities of illumination or different blinking rates of illumination.

11. The communications controller of claim 7, wherein the illumination component is incorporated in the actuator.

12. The communications controller of claim 7, wherein the illumination component is located adjacent to the actuator.

13. A method of presenting information to a user related to a state of operation of a portable media player, the method comprising:
- illuminating an illumination component adjacent to an external input component of a portable media player in a manner that indicates a state of wireless connectivity of the portable media player;
- detecting the selection of the external input component by a user of the portable media player; and
- displaying information related to the state of wireless connectivity of the portable media player on a display component of the portable media player in response to the detected selection of the external input component.

14. The method of claim 13, wherein the external input component comprises a pushbutton.

15. The method of claim 13, wherein the state of wireless connectivity relates to wireless connectivity between the portable media player and a wireless network in proximity to the portable media player.

16. The method of claim 15, wherein the displayed information includes characteristics of the wireless network.

17. The method of claim 15, wherein the displayed information includes information about data transfer occurring via the wireless network.

18. The method of claim 13, wherein the state of operation relates to a power level of the portable media player.

19. The method of claim 13, wherein the state of operation relates to an amount of storage available on a storage device in the portable media player.

* * * * *